United States Patent [19]

Cooper

[11] 4,287,759
[45] Sep. 8, 1981

[54] DEVICE FOR SENSING THE TENSION IN A LOAD CARRYING LINE

[75] Inventor: George W. Cooper, San Leandro, Calif.

[73] Assignee: Fruehauf Corporation, Detroit, Mich.

[21] Appl. No.: 9,952

[22] Filed: Feb. 6, 1979

[51] Int. Cl.³ .............................................. G01L 5/10
[52] U.S. Cl. ................................ 73/862.45; 254/273; 73/862.48
[58] Field of Search ................... 73/144; 254/272, 273

[56] References Cited

U.S. PATENT DOCUMENTS

| | | | |
|---|---|---|---|
| 2,743,607 | 5/1956 | Decker | 73/144 |
| 2,986,932 | 6/1961 | Melton | 73/144 |
| 3,398,575 | 8/1968 | Saxl | 73/144 |
| 3,513,803 | 5/1970 | Bowden et al. | 73/144 |
| 3,554,025 | 1/1971 | Andersson et al. | 73/144 |
| 3,832,899 | 9/1974 | Nicolau | 73/144 |
| 3,943,761 | 3/1976 | Shoberg et al. | 73/144 |
| 4,130,014 | 12/1978 | Eddens | 73/144 |

Primary Examiner—Billy S. Taylor
Attorney, Agent, or Firm—Bruce & McCoy

[57] ABSTRACT

An improved load line sensor comprised of a support frame which clamps to the load line, a sensing unit fixed to the support frame, and a pivotal load line operator attached to the support frame in a close spaced relation to the clamping end thereof. The load line which is threaded through the pivotal operator is slightly deformed thereby so that line tension imparts a torque to the operator which reacts against the load sensing unit fixed to the support frame. The load line operator preferably has roller contacts wherein the pivoting and roller action of the operator minimizes the frictional influences which impair the operation of conventional devices.

1 Claim, 4 Drawing Figures

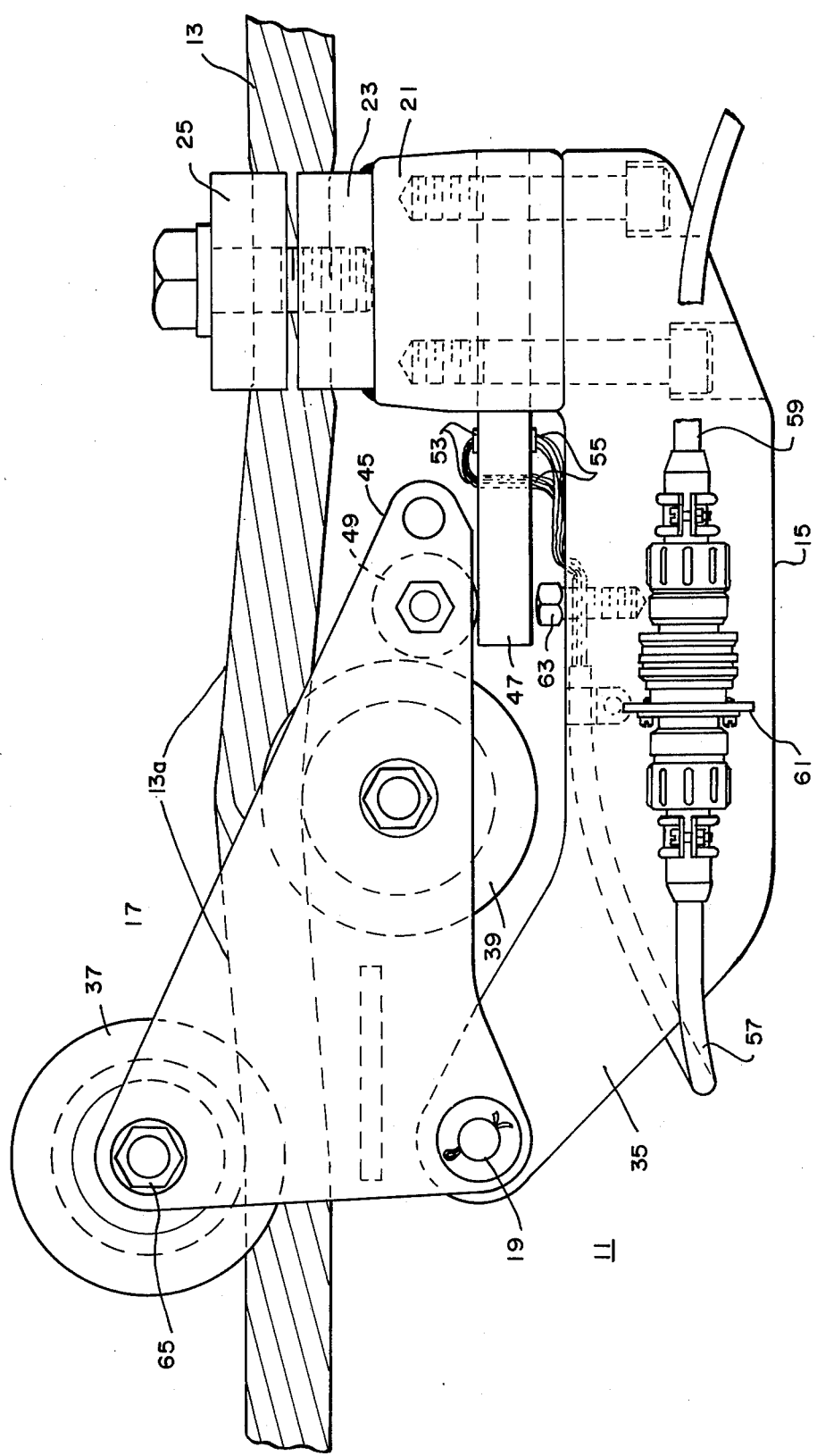
FIG.—1

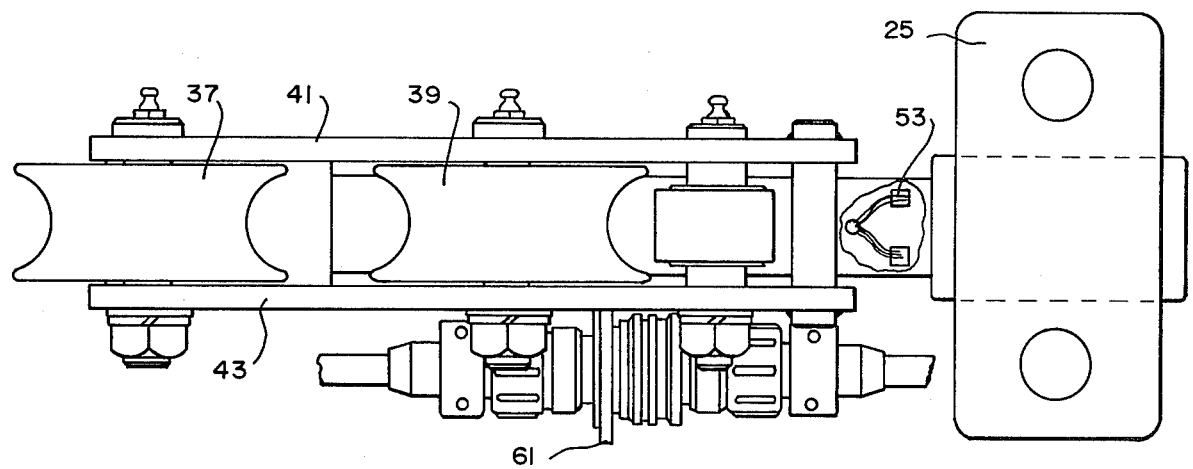
FIG.—2
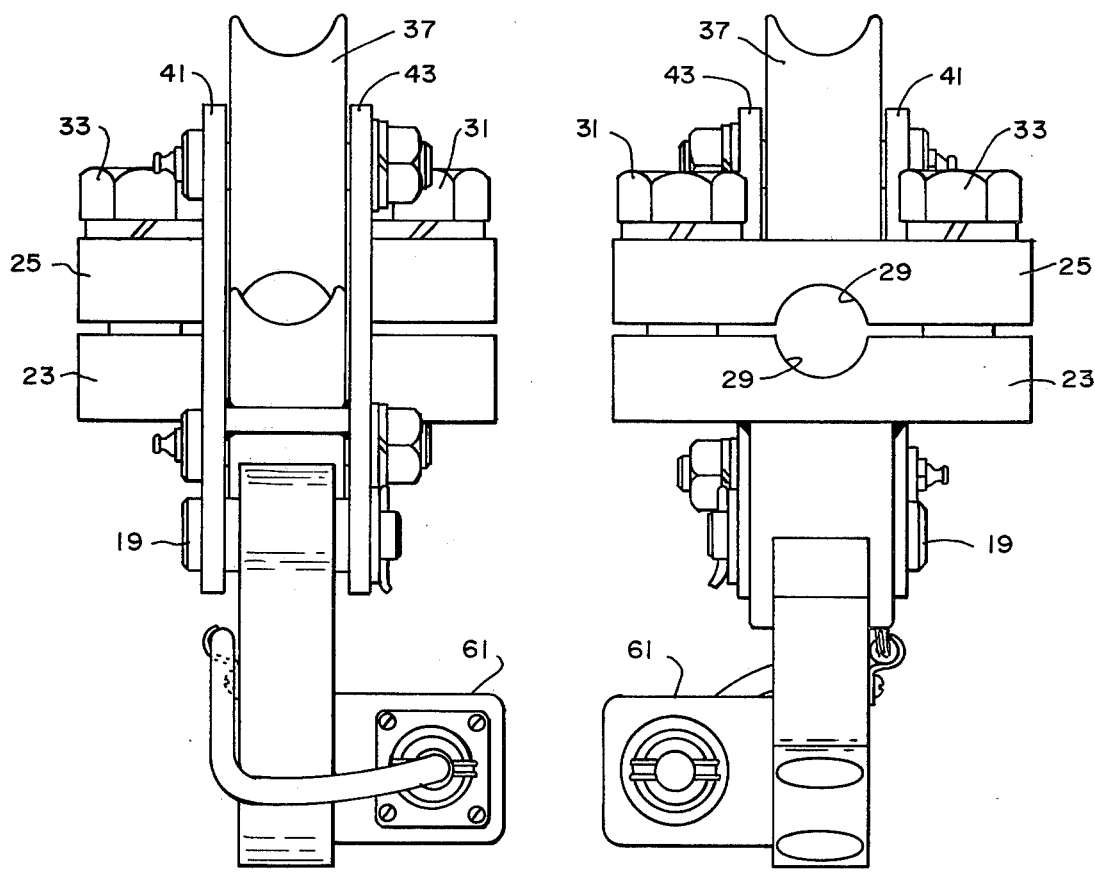
FIG.—3  FIG.—4

DEVICE FOR SENSING THE TENSION IN A LOAD CARRYING LINE

BACKGROUND OF THE INVENTION

1. FIELD OF THE INVENTION

The present invention relates to load detection devices, and more particularly to an improved load sensing device adapted for attachment to a load carrying line of a lifting crane for accurately sensing the tension in the line.

2. DESCRIPTION OF THE PRIOR ART

To operate and protect lifting cranes, such as those used in the material and cargo handling and construction fields, it is desirable to continually measure the tension or loading that exists in the crane's lifting ropes or load lines, which are generally steel strand wire ropes designed to support large weights. Not only is it important to provide for warnings of an overload condition, but it is also useful to provide indications of loading changes, and to detect conditions where the loading is released from the wire ropes, such as when a cargo is set down at a location out of view of a lifting crane operator.

Load line tension is generally measured using one of two types of measuring devices: An in-line type of sensing device which interrupts the rope or attaches at a rope dead end connection so as to act directly in the rope's line of force, or a sensor of a rope deforming type which operates on the principle that the restoring force in a load line deformed from its straight line condition by an external load line operator will provide a detectable force on the operator proportional to the tension in the line. In-line devices can be relatively expensive or impractical to install because of the need to break the rope for its installation. However, devices of the rope deforming type have the disadvantage of being relatively inaccurate when compared to in-line devices.

The problems of line deforming sensors are largely due to friction caused by relative movement of the load line and the line contacting sensing device, but can also result from other extraneous effects such as temperature variations and structural arrangement. As a specific example, a device has previously been designed for a static wire rope wherein the wire rope is secured by the two extreme ends of the device, with one end being a sliding securement; the rope is deformed in the middle between the two securements by a load sensing unit which cradles the rope on a suitable curved support surface. It is believed that the relative inaccuracy of this device is primarily caused by the relative movement of contact surfaces which occurs with a change in tension in the rope.

The present invention is an improvement on existing load sensing devices of the line deforming type, and particularly, those installed on a static wire ropes. The invention substantially overcomes the friction problems and other extraneous influences affecting the accuracy, sensitivity, and repeatability of conventional sensing devices by providing a load sensing device which is compact and eliminates sliding contact between the device's structural elements and the wire rope. The invention also has the advantage of being easily installed and removed from any wire rope that can be slackened to a condition to permit clamping and is adapted for use on all sizes and types of ropes and to most any loading capacity and condition.

SUMMARY OF THE INVENTION

The present invention is an improved load sensing device which is adapted for attachment to a load carrying line at any suitable point along the line. The sensing device is comprised of a support frame having a clamping end adapted to be clamped to the load line and a sensing unit fixed thereto. A pivotal load line operator having a generally triangular configuration is attached to the frame in spaced relation to the frame's clamping end and has first and second load line bearing elements disposed to capture and deform the load carrying line when it is threaded therebetween; the restoring forces of the deformed load line exerted on the load bearing elements of the pivotal operator cause a torque in the operator which urges a torque transmitting end of the operator, in rotating fashion, against the load sensing unit carried in the support frame. The pivotal operator through its pivotal cooperation with the support frame applies a force to the load sensing unit which is substantially proportional to the tension in the load line threaded through the operator. The operator together with the clamping of the support frame operatively hold the load sensing device of the present invention onto the load carrying line.

In the preferred aspect of the invention the pivotal load line operator has roller elements for contacting the load line and load sensing unit. This provides a pivotal roller operator which minimizes the frictional influences which affect the device's accuracy, sensitivity and repeatability.

OBJECTS OF THE INVENTION

It is therefore an object of the present invention to provide a load sensing device which accurately measures the tension in a load line without the need of breaking or interrupting the line.

It is another object of the present invention to provide a load sensing device which is portable and compact and readily installed on any wire rope that can be slackened to a condition which permits a slight deformation of the rope.

It is a further object of the present invention to provide a load sensing device which can be attached to all sizes and types of wire rope and which will operate over a wide range of loading conditions.

Other objects of the present invention will be apparent from the following specification and claims.

DESCRIPTION OF THE DRAWINGS

FIG. 1 is a side elevational view of a load sensing device according to the present invention showing the device operatively held on a section of load line.

FIG. 2 is a top plan view of the load sensing device shown in FIG. 1.

FIG. 3 is a front elevational view of the load sensing device shown in FIG. 1.

FIG. 4 is a rear elevational view of the load sensing device shown in FIG. 1.

DESCRIPTION OF THE PREFERRED EMBODIMENT

Referring now to the drawings, FIG. 1 shows a load sensing device, generally denoted by the number 11, which is operatively held on a load carrying line 13 so as to cause the load line to deform from its normal straight line suspended condition over the relatively small section of the line denoted 13a. The two cooperating structural elements of the sensing device which cause the deformation in the load line are the unitary support frame 15 and the load line operator 17. The operator is pivotally attached to the support frame to form an operator pivot 19, about which the operator is urged by the restoring forces of the captured load line segment.

With further reference to the drawings, it is seen that the support frame 15 has a clamping end 21 adapted to be clamped to the load line 13, preferably by opposing clamping plates 23, 25 having opposed recessed channels 27, 29 which fit over and surround the load line 13 to provide a firm clamping force thereagainst. The clamping plates can be secured by any suitable means, such as machine bolts 31, 33, which are most clearly shown in FIG. 4 as securing together the opposite extended ends of clamping plates 23, 25. From its clamping end 21, the unitary support frame extends to form an extension arm 35, which, when the device is attached to a load line, substantially parallels the captured line; it is seen that the load line operator 17 which is pivotally held on this extension arm is closely spaced on the line in relation to the clamping end of the support frame. This compact configuration, it is believed, minimizes any extraneous effects which structural arrangement may have on the sensor's operation.

Turning to the load line operator, it can be seen that first and second spaced-apart load line bearing elements, in the form of first and second roller members 37, 39, are secured between two triangularly shaped side-plates 41, 43 which form the carrying frame of the operator 17. The operator has an extended torque transmitting end 45 which in the illustrated embodiment is formed by an extension of the carrying frame toward the clamping end 21 of the support frame 15. This torque transmitting end is radially spaced from the operator pivot 19 such that it will react against the load sensing unit 47 when torque is applied to the operator by the load line segment 13a. It is noted that a contact roller 49 is preferably provided at the torque transmitting end of the load line operator. Thus, it can be seen that in the preferred embodiment the only surface contacts subject to relative movement, namely the load line operator contact with the load line 13 and the sensing unit 47, are roller contacts, with the result that sliding friction internal and external to the device is absolutely minimized.

The sensing unit which is secured to the device's support frame 35 proximate the support frame's clamping end 21 is preferably a flexual beam 47 secured to and extending from the support frame such that the torque transmitting end 45 of the load line operator 17 reacts with the extended end of the beam. The stress induced in the flexual beam 47 by the load line operator will be proportional to the tension in the load line 13 that is threaded through the operator. This stress can be measured by suitable electrical means, such as foil sensor pairs 53, 55. The foil sensors provide for very accurate stress measurement, and are preferably wired into a Wheatstone bridge circuit configuration to produce a voltage signal which relates directly to the foil resistance changes, and which can be calibrated in terms of load line tension. The obtained tension indicative voltage signal is fed through connecting cables 57, 59 to any suitable external and remote read-out device (not shown); it can also be used to trigger appropriate warning and/or signalling devices. To facilitate electrical connection once the sensing device is installed on the load line, an electrical connector 61 is, by means of mounting plate 34, secured to the extension arm 35 of the sensing device's support frame.

It is noted that the maximum deflection of the flexual beam 47 can be controlled by an adjustable stop 63 secured to the support frame underneath the extended end of the flexual beam.

To install the load sensing device of the present invention the outermost roller 37 is first removed by means of bolt 65, and then the support frame 15 is clamped onto a suitable segment of slack load line by tightly securing the load line between the clamping plates 23, 25 by means of bolts 31, 33. With the load line bearing against roller 39, the outer roller 37 is then replaced so that the load line segment 13a deforms over the interior roller 39 between the clamping plates 23, 25 and the outer roller 37. So deformed, it can be seen that when tension is placed on the load line the restoring forces of the deformed line which are exerted on the roller members 37, 39 cause a torque in the operator which urges the torque transmitting end 45 thereof against the load sensing element 47. It is also seen that the load sensing device 11 is operatively held onto the load line because of the securement of the load line by the operator 17, which captures the line between its roller members 37, 39, and the clamping end 21 of the support frame 15, which is tightly clamped to the line.

Therefore, it can be seen that the present invention is a load sensing device for a load carrying line which can be quickly and easily installed on the line without the need for breaking the line, and which provides a high degree of accuracy and sensitivity as compared to conventional load sensing devices of its type. Although the present invention has been described in considerable detail in the foregoing specification, it is not intended that it be limited to such detail, except as necessitated by the appended claims.

What I claim is:

1. An improved load sensing device adapted for attachment to a load carrying line comprising
a support frame having a clamping end adapted to fixably clamp to said load carrying line,
a load sensing unit fixed to said support frame, and
a rigid load line operator pivotally attached to said support frame in spaced relation to the clamping end thereof, said load line operator comprising
a torque transmitting end radially disposed from the pivot formed by the line operator's pivotal attachment to said support frame so as to react against the load sensing unit secured to said frame when torque is applied to said operator, and
first and second spaced apart load line bearing elements disposed to capture and deform a segment of the load carrying line threaded therebetween when said support frame is claimed to said load carrying line whereby the restoring forces of the deformed load carrying line exerted on said first and second load bearing elements of said operator cause a torque in said operator which urges the torque transmitting end thereof against said load sensing unit whereby the force applied to said load sensing unit is substantially proportional to the tension in the load carrying line threaded through said operator, and whereby said load sensing device is operatively held on said load carrying line due to the securement thereof by said load line operator and by the clamping end of said support frame,
said load line operator being generally triangular in configuration, with the operator pivot, the first load line bearing element of the operator, and the torque transmitting end of the operator defining the corners of the triangle of said triangular configuration, and with said second load line bearing element being located within said triangle intermediate said operator pivot and the torque transmitting end thereof.

* * * * *